United States Patent

Chane-Ching et al.

Patent Number: 5,858,242
Date of Patent: Jan. 12, 1999

[54] HEAVY METAL CATION RECOVERING AGENT INCLUDING A SILICATE OR ALUMINOSILICATE TYPE COMPOUND AND A CARBONATE TYPE COMPOUND

[75] Inventors: Jean-Yves Chane-Ching, Eaubonne; Yves Mottot, Tremblay-en-France, both of France

[73] Assignee: Rhone-Poulenc Chimie, Courbevoie, France

[21] Appl. No.: 737,072

[22] PCT Filed: Apr. 28, 1995

[86] PCT No.: PCT/FR95/00557

§ 371 Date: May 20, 1997

§ 102(e) Date: May 20, 1997

[87] PCT Pub. No.: WO95/29875

PCT Pub. Date: Nov. 9, 1995

[30] Foreign Application Priority Data

Apr. 29, 1994 [FR] France ..................................... 94 05215

[51] Int. Cl.⁶ ................................ C02F 1/62; B01J 20/16
[52] U.S. Cl. .......................... 210/679; 210/688; 210/912; 502/68; 502/84; 502/407; 502/411; 502/516
[58] Field of Search ..................................... 210/679, 688, 210/912–914; 502/68, 84, 407, 411, 516

[56] References Cited

U.S. PATENT DOCUMENTS

| | | | |
|---|---|---|---|
| 4,256,587 | 3/1981 | Carnahan | 210/670 |
| 4,752,397 | 6/1988 | Sood | 210/688 |
| 4,765,908 | 8/1988 | Monick | 210/666 |
| 4,866,019 | 9/1989 | van Broekhoven | 502/68 |
| 4,871,711 | 10/1989 | Martin et al. | 502/407 |
| 4,935,146 | 6/1990 | O'Neill et al. | 210/688 |
| 5,326,734 | 7/1994 | Vaughan | 502/84 |
| 5,426,083 | 6/1995 | Bhattacharyya et al. | 502/411 |
| 5,531,906 | 7/1996 | Takayama et al. | 210/912 |

FOREIGN PATENT DOCUMENTS

| | | |
|---|---|---|
| 0 410 877 | 1/1991 | European Pat. Off. . |
| 0 533 205 | 3/1993 | European Pat. Off. . |
| 61-263 636 | 11/1986 | Japan . |
| 62-059 519 | 3/1987 | Japan . |

*Primary Examiner*—Thomas G. Wyse
*Attorney, Agent, or Firm*—Katherine L. Carleton

[57] ABSTRACT

An agent for recovering heavy metal cations from an aqueous effluent, including a silicate or aluminosilicate type compound, e.g. an alkali metal silicate or aluminosilicate, and a carbonate type compound, e.g. an alkali metal carbonate, and preferably a carrier such as a lay. The agent may also form a cation stabilizer. Said agent is useful for removing or stabilizing heavy metal cations in the water used for cleaning flue gases from waste incineration, particularly household refuse and industrial waste incineration.

14 Claims, No Drawings

HEAVY METAL CATION RECOVERING AGENT INCLUDING A SILICATE OR ALUMINOSILICATE TYPE COMPOUND AND A CARBONATE TYPE COMPOUND

The present invention relates to an agent for the uptake of heavy metal cations contained in a medium, especially an aqueous effluent.

The invention also relates to an agent for stabilizing the said heavy metal cations.

The incineration of waste material is subject to a quite strict statutory policy.

Legislation in the field of discharges of heavy metals into the environment is, in particular, in full development. The waters from washing (or purification) of the fumes of stations for the incineration of waste material, especially domestic refuse or industrial waste, of industrial effluents of the sulphur-containing effluent type, for example waste sulphuric acids, are media containing heavy metal cations. Similarly, some soils are polluted by the presence of such cations.

Thus, in the field of waters from the washing of the fumes from stations for the incineration of waste material, for example of domestic refuse, a conventional process for the removal of heavy metal cations consists of a basic precipitation carried out using lime, assisted by a finishing treatment using a sulphur-based precipitating agent; the decantation/separation step which follows is generally improved by the incorporation of a flocculant.

However, this process has a certain number of drawbacks.

In particular, a very large volume of sludge is generated by the precipitation using lime; after filtration and compaction in cake form, this sludge must currently be placed in specific dumping grounds.

Furthermore, the use of organic materials, such as the sulphur-based precipitating agent and the flocculant, which are at least partly found in the cake, are harmful to the placing in dumping grounds (degradation with formation of reducing gases over time).

Finally, the sludge composition obtained may be difficult to stabilize (or to immobilize) by the current techniques. The presence of a large amount of calcium in this sludge may greatly inhibit the stabilization (or immobilization) operations such as, for example, the stabilization by vitrification. However, future regulations relating to the storage of final special waste material require the cake to be stabilized (or immobilized), before admission onto the storage site, in order very substantially to reduce the leaching of this type of waste material.

The object of the present invention is especially to provide a means for allowing the efficient uptake (or removal) of heavy metal cations which does not have the aforementioned drawbacks.

To this end, the present invention proposes a novel agent for the uptake (or removal) of heavy metal cations present in a medium, the said agent being an inorganic product comprising at least one compound of the silicate or aluminosilicate type, at least one compound of the carbonate type and, preferably, at least one support, preferably a clay.

The invention also relates to an agent for stabilizing (or immobilizing) the said heavy metal cations comprising the said uptake agent.

The Applicant has found, surprisingly, that the use of an agent for the uptake of heavy metal cations as defined above allowed very efficient removal of the said cations from the media containing them and, advantageously, an improvement of the sludge obtained/supernatant liquid separation and decantation, an improvement of the ability of this sludge to stabilize, that in to say an improvement of the ability of the latter to resist leaching, and a marked decrease in the residual calcium content of the precipitate relative to that which is obtained with the conventional process described above.

Thus, one of the subjects of the invention is an agent for the uptake (or removal) of heavy metal cations contained in a medium, characterized in that the said agent comprises:
- at least one compound of the silicate or aluminosilicate type, referred to below as compound A; and
- at least one compound of the carbonate type, referred to below as compound B.

The term heavy metal cations refers in particular to the metal cations with a valency greater than or equal to 2, preferably equal to 2, and especially those chosen from antimony, arsenic, bismuth, cadmium, chromium, cobalt, copper, tin, manganese, molybdenum, nickel, gold, lead, thallium, tungsten, zinc, aluminia, iron and the metals of the actinide family.

The heavy metal cations towards which the present invention is more particularly directed are cadmium, chromium, copper, nickel, lead, zinc, aluminium and iron.

The said medium may, preferably, be a liquid medium.

This medium may thus consist of an aqueous effluent, especially the waters from washing (or purifying) the incineration fumes of waste material, especially domestic refuse, industrial waste and hospital waste, the waters from washing solid matter, such as earth, containing heavy metals, and aqueous surface treatment effluents.

The inorganic product for uptake (or removal) of the heavy metal cations contained in a medium according to the invention, which may be used to purify the said medium, thus comprises at least one active principle (or precipitation agent) consisting of at least one compound A and at least one compound B.

Compound A is preferably a silicate or aluminosilicate of an alkali metal, especially sodium or potassium.

Compound A is advantageously a sodium silicate.

The said sodium silicate then generally has an $SiO_2/Na_2O$ molar ratio of between 0.5 and 3.8.

Compound B is preferably an alkali metal carbonate or a hydroxycarbonate chosen from hydrotalcite and dawsonite.

Hydrotalcite is a basic magnesium aluminium carbonate.

Dawsonite is a basic aluminium sodium carbonate.

Advantageously, compound B is a carbonate of an alkali metal, preferably sodium.

The molar ratio between the compound B and the compound A may vary within a fairly wide range of values. In general, this ratio, expressed as the $CO_3^{2-}/SiO_2$ molar ratio, is between 0.05 and 10, preferably between 0.33 and 3.

The agent according to the invention may be in the form of a powder or a granulate.

According to a preferred embodiment of the invention, the agent according to the invention also comprises at least one support (or substrate).

The agent according to the invention may then be considered as a composite product formed:
- of at least one active principle (or precipitation agent) consisting of at least one compound A and at least one compound B, and
- at least one support (or substrate), preferably consisting of at least one clay.

This composite (inorganic) product is generally in powder form.

The support then contained in the agent according to the invention is preferably a clay.

The clay then contained in the agent according to the invention may be of natural or synthetic origin.

The clay employed in the agent according to is the invention advantageously has a high $Al_2O_3$ weight content; this content is, for example, between 20 and 40%.

It in preferred, according to the invention, to use a clay of lamellar or phyllosilicate structure.

A clay chosen from the group comprising kaolinites and serpentines may thus be used.

The clay may also be chosen from the group comprising montmorillonites, bentonites (which are alkaline in particular), talc and mica.

The clay chosen preferably belongs to one of these two groups.

A clay of chlorite-type structure may optionally be used.

The agent according to the preferred embodiment of the invention generally contains a montmorillonite as clay.

The content of support, in particular of clay, in the agent according to the preferred embodiment of the invention is usually between 10 and 90% by weight, for example between 20 and 80% by weight or between 10 and 30% by weight, relative to the total weight of the said agent.

The agent according to the invention generally has a water content of between 1 and 20% by weight. This water content is determined by measuring the weight lose on calcination at 350° C. for 6 hours.

The agent according to the invention may have a weight-average particle size of between 15 and 100 $\mu$m, for example between 20 and 75 $\mu$m.

The agents according to the invention are prepared by any suitable process.

Thus, according to a first variant, an aqueous solution of the compound A may thus be mixed, in a first step, either with an aqueous solution of the compound B, it being possible for the pH of the latter solution to be adjusted beforehand to the pH of the first solution, for example by addition of a base, especially sodium hydroxide, or may be mixed with the solid compound B.

Generally after having been stirred, the solution obtained using thin mixture is dried, especially by a flash process or, preferably, by spraying.

According to a second variant, a mixture obtained by adding an aqueous solution of the compound A to the solid compound B or by adding an aqueous solution of the compound B to the solid compound A is, optionally after having been stirred, subjected to a granulation using any type of known granulator, for example a plate granulator. This granulation is usually completed by a drying operation, preferably in a fluid bed.

The pH of the aqueous solution of the compound A is usually between 10 and 14.

In the case where the compound A is a sodium silicate, an aqueous solution of sodium silicate having an $SiO_2/Na_2O$ molar ratio of between 0.5 and 3.8 and a silicate concentration, expressed as $SiO_2$, of between 0.1 and 10 mol/l, for example of between 0.2 and 8 mol/l, is generally employed.

In the case where the compound B is a podium carbonate, an aqueous solution of sodium carbonate with a carbonate concentration, expressed as $Na_2CO_3$, of between 0.1 and 5 mol/l, for examle of between 0.2 and 3 mol/l, is generally employed.

The stirring operation is generally carried out for a period of between 5 ad 45 minutes, for example between 10 and 25 minutes.

The drying step is usually carried out at a temperature of approximately between 40° and 500° C., using any suitable device.

The drying may be done by spraying, especially in the first variant.

To this end, any suitable type of atomizer may be used, especially an atomizer of the Buchi type, a turbine atomizer, a nozzle atomizer, a liquid pressure atomizer or a two-fluid atomizer.

The inlet temperature in generally about 230° to 250° C. in the case of an atomizer of the Buchi type and of the order of 450° C. in the case of a turbine atomizer or a nozzle atomizer; similarly, the outlet temperature is usually about 110° to 140° C. in the case of an atomizer of the Buchi type and of the order of 125° C. in the case of a turbine atomizer or a nozzle atomizer.

It is also possible to use, for the drying operation, a device such as that described in U.S. Pat. No. 4,970,030, in which device the inlet temperature is generally of the order of 500° C. and the outlet temperature of the order of 150° C. (flash process).

The drying may be done in a fluid bed, especially in the second variant.

In the case where it is desired to prepare an agent according to the invention containing a support. in particular a clay, the process may be performed, according to a first variant, as outlined above, the support preferably being added to the mixture of the aqueous solution of the compound A and either of the aqueous solution of the compound B, it being possible for the pH of this solution to be adjusted beforehand to the pH of the first solution, for example by addition of a base, especially sodium hydroxide, or of the solid compound B. This addition is usually carried out during stirring of the said mixture, that is to say that the mixture is stirred before, during and after the addition of the support.

Similarly, according to a second variant, there is added, generally with stirring, to a support, in particular a clay, which has been introduced into a granulator beforehand, either a mixture of an aqueous solution of the compound A and an aqueous solution of the compound B, or, in a first stage, an aqueous solution of the compound A (or B respectively) followed by an aqueous solution of the compound B (or A respectively). The granulation may be carried out using, for example, a plate granulator, and is usually completed by a drying operation, preferably in a fluid bed.

At the end of the preparation (in these two variants) a product is obtained in which the active principle is, advantageously, intimately bound to the support.

The use of at least one agent according to the invention in order to remove heavy metal cations from a medium containing them, especially from a liquid effluent (or solution), in particular from an aqueous effluent (or solution), may be carried out in the following manner:

The agent according to the invention is introduced into the liquid effluent to be treated, with stirring. The final pH of the suspension containing the said agent is preferably between 7 and 12 or is adjusted to a value between 7 and 12 by addition of a base or an acid; the said pH may, in particular, be (adjusted to) about 9. The final pH depends on the amount of agent according to the invention introduced into the livid effluent to be treated and on the initial pit of the said effluent. The stirring in continued, for example for 5 to 60 minutes. The suspension is then left to stand (to settle), at room temperature, for a certain period, generally between 0.5 and 24 hours, in particular between 0.5 and 6 hours. The settling time may be reduced if rapid settling methods known to those skilled in the art are used. Then, the precipitate formed, that is to say the agent according to the invention charged with heavy metal cations, is separated by decantation, filtration and/or centrifugation of the suspension.

Generally, the medium to be treated, especially when It consists of a liquid effluent (in particular an aqueous of fluent (a solution)), contains 0.5 to 6000 mg/l, for example 1 to 1000 mg/l and in particular 2 to 100 mg/l, of heavy metal cations.

The amount of agent according to the invention added to the medium to be treated is such that the molar ratio of $(SiO_2+CO_3^{2-})/$(cations present in the medium to be treated) is generally between 0.7 and 2.5, for example between 1.0 and 2.2 and in particular between 1.1 and 1.9. The term cations present in the medium to be treated refers here to the heavy metal cations and the $Ca^{2+}$ cations.

The use of agent, according to the invention advantageously allows very efficient removal of heavy metal cations, especially within a fairly wide range of pH values, in general between 7 and 12.

Furthermore, it is observed that, after separation, the precipitate formed, that is to say the agent according to the invention charged with heavy metal cations, has a good ability to stabilize (or to immobilize). It has very good behaviour with regard to leaching; it is, in effect, very barely leachable, that is to say that it releases virtually none or very few of the heavy metal cations it contains when it is placed in the presence of water; the amounts of heavy metal cation chemical species in leachates obtained using conventionally performed leaching tests are very small.

Thus, another subject of the invention consists of an agent for stabilizing (or immobilizing) heavy metal cations contained in a medium, characterized in that it comprises at least one agent as described above.

Although the presence of a support in the agent according to the invention generally allows a localized precipitation at the edge of the said support, it also allows, surprisingly, settling to be promoted, and especially the rate of settling to be increased, in particular in the case of clay. Similarly, it can also make it possible to reduce the very low contents of heavy metal cations of the leachates as mentioned above.

The examples which follow illustrate the invention without, however, limiting the scope thereof.

EXAMPLE 1

The following are mixed together;

400 ml of an aqueous solution of sodium silicate with an $SiO_2/Na_2O$ molar ratio equal to 1, a silicate concentration, expressed as $SiO_2$, of 0.21 mol/l and a pH equal to 13, and an aqueous solution of sodium carbonate obtained by dissolving 8.84 grams of $Na_2CO_3$ in 400 ml of water, the pH of which solution is adjusted beforehand to 13 by addition of sodium hydroxide.

After having been stirred, the solution obtained using this mixture is dried using an atomizer of the Buchi type.

The flow rate is 20 ml/min; the inlet temperature is set at 240° C., the outlet temperature at 110° C.

The product obtained contains sodium silicate and sodium carbonate; it has a $CO_3^{2-}/SiO_2$ ratio of 1 and a water content of 7% by weight.

EXAMPLE 2

The following are mixed together:

657.5 ml of an aqueous solution of sodium silicate with an $SiO_2/Na_2O$ molar ratio equal to 3.3, a silicate concentration, expressed as $SiO_2$, of 2 mol/l and a pH equal to 12.5, and an aqueous solution of sodium carbonate obtained by dissolving 139.5 grams of $Na_2CO_3$ in 600 ml of water, the pit of which solution is adjusted beforehand to 12.5 by addition of sodium hydroxide and the volume of which is then made up to 657.5 ml by addition of water.

After having been stirred, the solution obtained using thin mixture is dried using an atomizer of the Buchi type.

The flow rate is 20 ml/min; the inlet temperature is set at 235° C., the outlet temperature at 120° C.

The product obtained contains sodium silicate and sodium carbonate; it has a $CO_3^{2-}/SiO_2$ ratio of 1 and a water content of 10% by weight.

EXAMPLE 3

The following are mixed together:

400 ml of an aqueous solution of sodium silicate with an $SiO_2/Na_2O$ molar ratio equal to 1, a silicate concentration, expressed as $SiO_2$, of 0.21 mol/l and a pH equal to 13, and an aqueous solution of sodium carbonate obtained by dissolving 8.84 grams of $Na_2CO_3$ in 400 ml of water, the pH of which solution is adjusted beforehand to 13 by addition of sodium hydroxide.

The solution obtained using this mixture is stirred.

75 grams of montmorillonite clay are then added thereto, while still being stirred.

The stirring is continued for 15 minutes.

The suspension obtained is finally dried using an atomizer of the Buchi type.

The flow rate is 10 ml/min; the inlet temperature is set at 240° C., the outlet temperature at 130° C.

The product obtained contains sodium silicate, sodium carbonate and montmorillonite clay; it has a $CO_3^{2-}/SiO_2$ ratio of 1, a montmorillonite clay content of 75% by weight and a water content of 6% by weight.

EXAMPLE 4

18 mg of the product prepared in Example 1 are introduced, with stirring, into 100 ml of a $CuCl_2$ solution having a $Cu^{2+}$ concentration of 48 mg/l, which amount corresponds to an $(SiO_2+CO_3^{2-})/Cu^{2+}$ molar ratio of about 2.1, and the stirring is maintained for 30 minutes.

The pH of the suspension obtained is equal to 9.7.

The suspension is then left to stand at room temperature for 4 hours.

It is then centrifuged at 3000 rev/min for 5 minutes.

The supernatant then has a $Cu^{2+}$ concentration, measured by atomic absorption, of less than 2 mg/l.

EXAMPLE 5

18 mg of the product prepared in Example 1 are introduced, with stirring, into 100 ml of a $ZnSO_4$ solution having a $Zn^{2+}$ concentration of 51 mg/l, this amount corresponding to an $(SiO_2+CO_3^{2-})/Zn^{2+}$ molar ratio of about 1.8, and the stirring is continued for 30 minutes.

The pH of the suspension obtained is equal to 8.2.

The suspension is then left to stand at room temperature for 4 hours.

It is then centrifuged at 3000 rev/min for 5 minutes.

The supernatant then has a $Zn^{2+}$ concentration, measured by atomic absorption, of less than 1.5 mg/l.

EXAMPLE 6

18 mg of the product prepared in Example 1 are introduced, with stirring, into 100 ml of a $CdCl_2$ solution having a $Cd^{2+}$ concentration of 88 mg/l, this amount corresponding to an $(SiO_2+CO_3^{2-})/Cd^{2+}$ molar ratio of about 1.8, and the stirring in continued for 30 minutes.

The pH of the suspension obtained is equal to 10.

The suspension in then left to stand at room temperature for 4 hours.

It is then centrifuged at 3000 rev/min for 5 minutes.

The supernatant then has a $Cd^{2-}$ concentration, measured by atomic absorption, of less than 0.5 mg/l.

EXAMPLE 7

An aqueous effluent containing $Fe^{3+}$, $Al^{3+}$, $Ca^{2+}$, $Zn^{2+}$, $Pb^{2+}$ and $Cd^{2+}$ cations is reconstituted as follows:

The following amounts are dissolved in 1 liter of 0.01M hydrochloric acid:

$CaCl_2.2H_2O$: 7.33 g $ZnCl_2$: 3.12 g $FeCl_3.6H_2O$: 0.483 g $PbCl_2$: 0.737 g $AlCl_3.6H_2O$: 0.994 g $3CdSO_4.8H_2O$: 0.068 g

The volume is made up to 2 liters by addition of water.

The pH of the effluent obtained is 1.3.

The said effluent has the following contents, expressed in mg/l:

$Ca^{2+}$: 1070 $Zn^{2+}$: 712

$Al^{3+}$: 52.8 $Pb^{2+}$: 274

$Fe^{3+}$: 50.9 $Cd^{2+}$: 5

1.745 g of the product prepared in Example 1 are introduced, with stirring, into 250 ml of the said effluent, and the stirring in maintained for 30 minutes.

The pH of the suspension obtained in 9.2.

The suspension is then left to stand at room temperature for 4 hours.

It is then centrifuged at 3000 rev/min for 10 minutes.

The following concentrations of $Ca^{3+}$, $Al^{3+}$, $Fe^{3+}$, $Zn^{2+}$, $Pb^{2+}$ and $Cd^{2+}$ of the supernatant are measured, expressed in mg/l:

$Ca^{2+}$: 85 $Zn^{3+}$: 1

$Al^{3+}$: <0.1 $Pb^{2+}$: <0.01

$Fe^{3+}$: <0.1 $Cd^{2+}$: 0.07

EXAMPLE 8

7.282 grams of the product prepared in Example 2 are introduced, with stirring, into 2 liters of a $ZnCl_2$ solution having a $Zn^{2+}$ concentration of 1 g/l, this amount corresponding to an $(SiO_2+CO_3^{2-})/Zn^{2+}$ molar ratio of about 1.9, and the stirring in maintained for 30 minutes.

The pH of the suspension obtained is equal to 9.35.

It is then centrifuged at 3000 rev/min for 10 minutes.

The supernatant has a $Zn^{2+}$ concentration, measured by atomic absorption, of 1.2 mg/l.

The precipitate is dried at room temperature. It weighs 8.36 grams.

32 ml of water are added to 2 grams of the said precipitate. The suspension obtained is stirred.

The pH is adjusted to the value 7 by addition of 1.4 ml of 0.5N acetic acid solution.

The volume is then made up to 40 ml by addition of water.

Next, the suspension is stirred for 20 hours and then filtered.

The filtrate has a low concentration of $Zn^{2+}$, i.e. of 5.5 mg/l; the precipitate is thus barely leachable.

EXAMPLE 9

1.722 grams of the product prepared in Example 2 are introduced, with stirring, into 2 liters of a $PbCl_2$ solution having a $Pb^{2+}$ concentration of 1 g/l, this amount corresponding to an $(SiO_2+CO_3^{2-})/Pb^{2+}$ molar ratio of about 1.4, and the stirring is maintained for 30 minutes.

The pH of the suspension obtained is equal to 9.5.

It is then centrifuged at 3000 rev/min for 10 minutes.

The supernatant has a $Pb^{2+}$ concentration, measured by atomic absorption, of 0.1 mg/l.

The precipitate is dried at room temperature. It weighs 2.23 grams.

24 ml of water are added to 1.5 grams of the said precipitate. The suspension obtained is stirred.

The pH is adjusted to the value 7 by addition of 0.1 ml of 0.5N acetic acid.

The volume is thee made up to 30 ml by addition of water.

Next, the suspension is stirred for 20 hours and then filtered.

The filtrate has a low concentration of $Pb^{2+}$, i.e. of 2 mg/l: the precipitate is thus very barely leachable.

EXAMPLE 10

80 mg of the product prepared in Example 3 are introduced, with stirring, into 100 ml of a $CuCl_2$ solution having a $Cu^{2+}$ concentration of 50 mg/l, this amount corresponding to an $(SiO_2+CO_3^{2-})Cu^{3+}$ molar ratio of about 1.7, and the stirring is continued for 30 minutes.

The pH of the suspension obtained is brought to 8 by addition of 0.1 ml of 0.5N hydrochloric acid.

The suspension is then left to stand at room temperature for 4 hours.

It is then centrifuged at 3000 rev/min for 5 minutes.

The supernatant then has a $Cu^{2+}$ concentration, measured by atomic absorption, of less than 2 mg/l.

EXAMPLE 11

80 mg of the product prepared in Example 3 are introduced, with stirring, into 100 ml of a $CuCl_2$ solution having a $Cu^{2+}$ concentration of 50 mg/l, this amount corresponding to an $(SiO_2+CO_3^{2-})/Cu^{2+}$ molar ratio of about 1.7, and the stirring is continued for 30 minutes.

The pH of the suspension obtained is brought to 12 by addition of 0.5 ml of 1N sodium hydroxide.

The suspension is then left to stand at room temperature for 4 hours.

It is then centrifuged at 3000 rev/min in for 5 minutes.

The supernatant then has a $Cu^{2+}$ concentration, measured by atomic absorption, of less than 2 mg/l.

EXAMPLE 12

75 grams of montmorillonite clay are added, with stirring, to 830 ml of an aqueous solution of sodium silicate with an $SiO_2/Na_2O$ molar ratio equal to 1 and a silicate concentration, expressed as $SiO_2$, of 0.2 mol/l.

The stirring is continued for 15 minutes.

The suspension obtained is finally dried using an atomizer of the Buchi type.

The flow rate is 10 ml/min; the inlet temperature is set at 240° C., the outlet temperature at 135° C.

The product obtained contains sodium silicate and 72% by weight of montmorillonite clay; it has a water content of 9% by weight.

EXAMPLE 13

The rates of settling obtained during the use of products prepared in Examples 1, 3 (products according to the invention) and 12 (products not according to the invention) in order to purify a solution containing heavy metal cations, in this case $Cu^{2+}$ cations, are compared here.

(1) 180 mg of the product prepared in Example 1 are introduced into 100 ml of a $CuCl_2$ solution having a $Cu^{2+}$ concentration of 500 mg/l, and the pH is brought to 8 by addition of 0.5 ml of 0.5N hydrochloric acid.

(2) 803 mg of the product prepared in Example 3 are introduced into 100 ml of a $CuCl_2$ solution having a $Cu^{2+}$ concentration of 500 mg/l, and the pH is brought to 8 by addition of 1.5 ml of 0.5N hydrochloric acid.

(3) 803 mg of the product prepared in Example 12 are introduced into 100 ml of a $CuCl_2$ solution having a $Cu^{2+}$ concentration of 500 mg/l, and the pH in brought to 8 by addition of 3 ml of 0.5N hydrochloric acid.

After stirring for 1 minute, each of the suspensions obtained in (1), (2) and (3) is poured into measuring cylinders.

The rates of settling are compared.

The table below shows, for each product prepared in Examples 1, 3 and 12, the total volume clarified (in ml) at various times during the settling (in minutes):

| Examples | Settling time (min) | | | | | | |
|---|---|---|---|---|---|---|---|
| | 0 | 5 | 10 | 20 | 40 | 60 | 85 |
| 1 | 0 | 2 | 7 | 20 | 40 | 55 | 65 |
| 3 | 0 | 18 | 48 | 62 | 69 | 72 | 75 |
| 12 | 0 | 1 | 5 | 15 | 31 | 45 | 54 |

The fastest rate of settling is obtained with the product according to the invention prepared in Example 3 (silicate-carbonate/clay composite).

The slowest rate of settling is obtained with the product not according to the invention prepared in Example 12.

What is claimed is:

1. An agent for the uptake of heavy metal cations contained in a medium, comprising:
   at least one compound A consisting of an alkali metal silicate; and
   at least one compound B consisting of an alkali metal carbonate or a hydroxycarbonate selected from the group consisting of hydrotalcite and dawsonite.

2. An agent according to claim 1, wherein the said compound A is a sodium or potassium silicate.

3. An agent according to claim 2, wherein the said compound A is a sodium silicate which has an $SiO_2/Na_2O$ molar ratio of between 0.5 and 3.8.

4. An agent according to claim 1, wherein the said compound B is an alkali metal carbonate.

5. An agent according to claim 4, wherein the said compound B is a sodium carbonate.

6. An agent according to claim 1, wherein the compound B/compound A molar ratio, expressed as the $CO_3^{2-}/SiO_2$ molar ratio, is between 0.05 and 10.

7. An agent according to claim 1, further comprising at least one support consisting of a clay.

8. An agent according to claim 7, wherein it has a support content of between 10 and 90% by weight.

9. An agent according to claim 7, wherein the said clay is a clay of natural or synthetic origin.

10. An agent according to claim 9, wherein the said clay is a montmorillonite.

11. An agent according to claim 1 having a weight-average particle size of between 15 and 100 $\mu$m.

12. An agent according claim 1, wherein the said medium is an aqueous effluent.

13. An agent according to claim 12, wherein the said aqueous effluent consists of the waters from washing of the incineration fumes of waste material.

14. A process for stabilizing heavy metal cations contained in a medium, comprising the step of using at least one agent, comprising:
   at least one compound A consisting of an alkali metal silicate; and
   at least one compound B consisting of an alkali metal carbonate or a hydroxycarbonate selected from the group consisting of hydrotalcite and dawsonite.

* * * * *